United States Patent
Kawada et al.

(10) Patent No.: US 6,626,020 B2
(45) Date of Patent: Sep. 30, 2003

(54) METHOD OF PRODUCING VIBRATION-ISOLATING BUSHING

(75) Inventors: Michihiro Kawada, Osaka (JP); Hiroaki Takahashi, Osaka (JP); Hideo Tadano, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 21 days.

(21) Appl. No.: 10/042,555

(22) Filed: Nov. 16, 2001

(65) Prior Publication Data

US 2002/0079614 A1 Jun. 27, 2002

(30) Foreign Application Priority Data

Dec. 25, 2000 (JP) .......................... 2000-393527

(51) Int. Cl.⁷ ................................ B21B 3/00
(52) U.S. Cl. .................... 72/67; 72/406; 29/898.054
(58) Field of Search ...................... 72/67, 115, 406, 72/67 F, 406 F, 84, 370.03; 29/898.054, 898.057

(56) References Cited

U.S. PATENT DOCUMENTS

| | | | | |
|---|---|---|---|---|
| 3,494,161 A | * | 2/1970 | Silichey ........................ 72/115 |
| 4,984,443 A | * | 1/1991 | Sato et al. ...................... 72/67 |
| 5,007,281 A | * | 4/1991 | Aoshima et al. ............... 72/406 |
| 5,301,414 A | * | 4/1994 | Gautheron .................... 29/451 |

FOREIGN PATENT DOCUMENTS

| | | | | |
|---|---|---|---|---|
| JP | 57-206544 A | * | 6/1981 | ............. B21J/9/02 |
| JP | 57-206544 A | * | 12/1982 | |
| JP | 59-206136 A | * | 11/1984 | |
| JP | 59-206136 A | * | 11/1984 | ........... B21K/23/04 |
| JP | 2000-2278 | | 1/2000 | |

\* cited by examiner

*Primary Examiner*—Allen Ostrager
*Assistant Examiner*—John S. Goetz
(74) *Attorney, Agent, or Firm*—Knobbe Martens Olson & Bear, LLP (57) ABSTRACT

A method of producing a vibration-isolating bushing with which it is possible to secure a larger area of the edge surface of an inner cylinder than in the prior art method. In upsetting one extremity of the inner cylinder by cold plastic working, after a rubber elastomer is secured to the outer circumference of the inner cylinder by vulcanization molding, as a jig for pressing onto the edge surface of the inner cylinder, an upsetting jig whose top surface is flat is used and the top surface of the jig is pressed onto the edge surface of the inner cylinder while causing the jig to gyrate on a conical orbit centering the axis of the inner cylinder, whereby the outside diameter only of the extremity is enlarged while suppressing the enlarging of the inside diameter.

2 Claims, 9 Drawing Sheets

METHOD OF PRODUCING VIBRATION-ISOLATING BUSHING

BACKGROUND OF THE INVENTION

1. Field of the Invention

This invention relates to a method of producing a vibration-isolating bushing which is mainly used by being assembled into an automobile suspsension system or the like.

2. Description of Related Art

In an automobile suspesnsion system, a cylindrical vibration-isolating bushing is generally used at a coupling part between the vehicle body and the suspension, namely the coupling part between a lower arm or other arm for supporting wheels and a vehicle body side member such as a frame with a view to vibration damping and shock absorbing. The cylindrical vibration-isolating bushing can also be used for an engine mount supporting or bearing the engine in a vibration-proof fashion.

Figure 8:
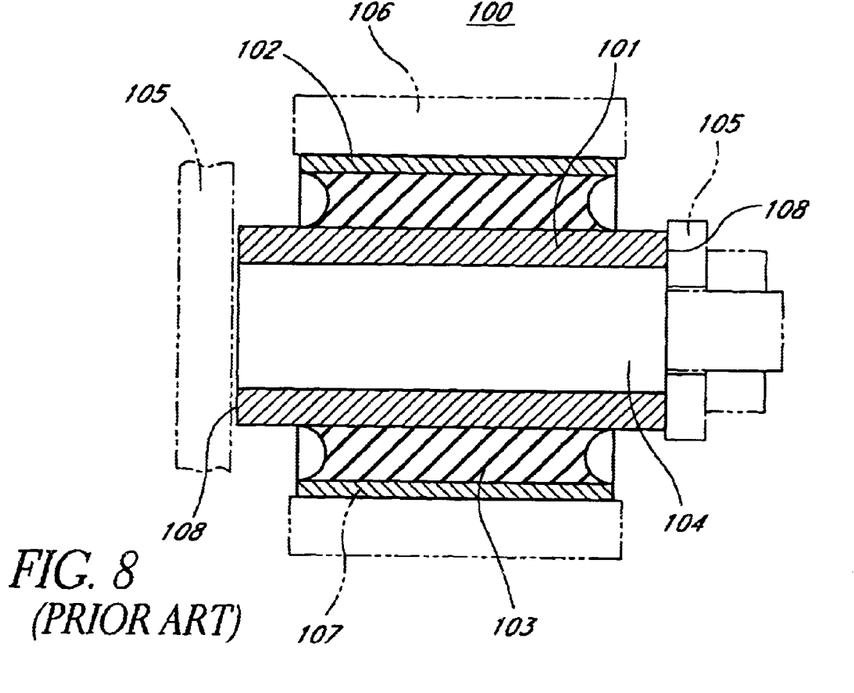
FIG. 8 is a longitudinal sectional view showing one example of a conventional vibration-isolating bushing.

A conventional vibration-isolating bushing is, for example, known in the art as shown in FIG. 8, wherein the bushing 100 is made up of an inner cylinder 101 and an outer cylinder 102 both made of metal and disposed concentrically, and a rubber elastomer 103 interposed between the both. When the bushing 100 is used, a shaft component 104 is inserted in the inner cylinder 101, which is in turn fastened to supporting components 105 such as brackets pinching it from both sides thereby to fix the inner cylinder. On the other hand, the outer cylinder 102 is inserted in an attachment hole 107 of another supporting component 106 to be fixed to it.

Since the inner cylinder 101 of the vibration-isolating bushing 100 is pinched and held at both extremities thereof by the supporting components 105 in this way, if the area of the edge surface 108 of the inner cylinder 101 is small, the surface pressure of the edge surface subjected to an axial force by the fastening becomes higher, with the result that the supporting members 105 such as brackets press formed by a plate material subside and a problem of bolts releasing is caused.

In order to suppress the surface pressure of the aforementioned edge surface against the axial force by fastening to less than a definite value, an approach of thickening the entire wall thickness of the straight-formed inner cylinder 101 is adopted thereby enlarging the areas of the edge surfaces 108 in contact with the supporting components 105. However, where such a thick-walled inner cylinder 101 is employed, the area of each of the edge surfaces 108 is enlarged, yet the problem is encountered that its weight is significantly increased.

Figure 9:
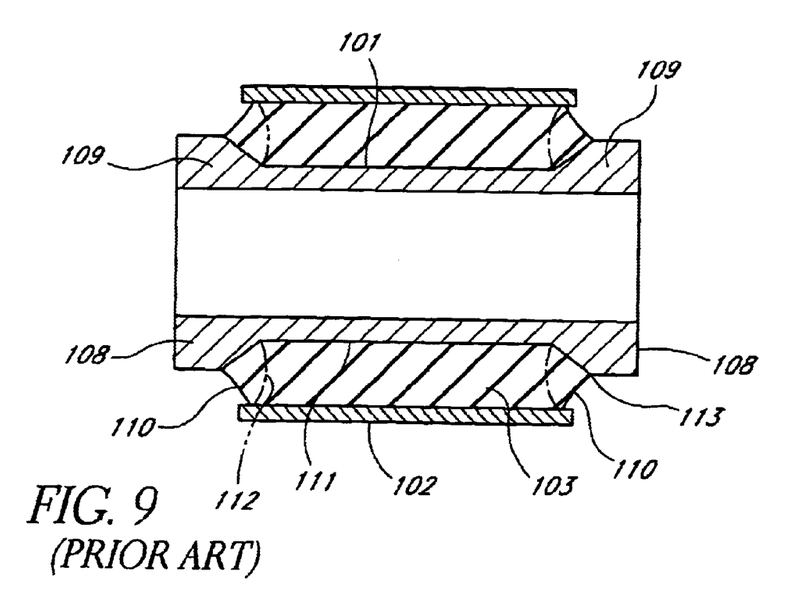
FIG. 9 is a longitudinal sectional view showing another example of a conventional vibration-isolating bushing.

Another approach of enlarging the area of the edge surface is also known, for example, as shown in FIG. 9, wherein a profiled inner cylinder 101 whose both extremities 109 are thicker-walled than the intermediate part is employed. In this case, however, because of the profiled shape of the inner cylinder 101, such a preformed material that is worked by forging, etc. is employed and hence a cost increase is entailed. Furthermore, when the rubber elastomer 103 is molded by vulcanization, the free length of each of edge surfaces 110 of the rubber elastomer 103 cannot be sufficiently secured from the respect of mold releasing after molding, etc. and consequently, there is a problem of deterioration in durability. More specifically stated, where the extremities 109 of the inner cylinder 101 are preliminarily formed with an enlarged diameter, in vulcanization molding the rubber elastomer 103, a small-diameter portion 111 inboard of the extremities 109 assumes an undercut shape relative to the mold releasing in the axial direction, so that edge surfaces 110 of the rubber elastomer 103 cannot be set at two dots-dash line positions 112 considering the mold releasing after molding. That's why the areas of the edge surfaces 110 of the rubber elastomer 103 are too small to secure a sufficient free length to elastic deformation.

Figure 10:
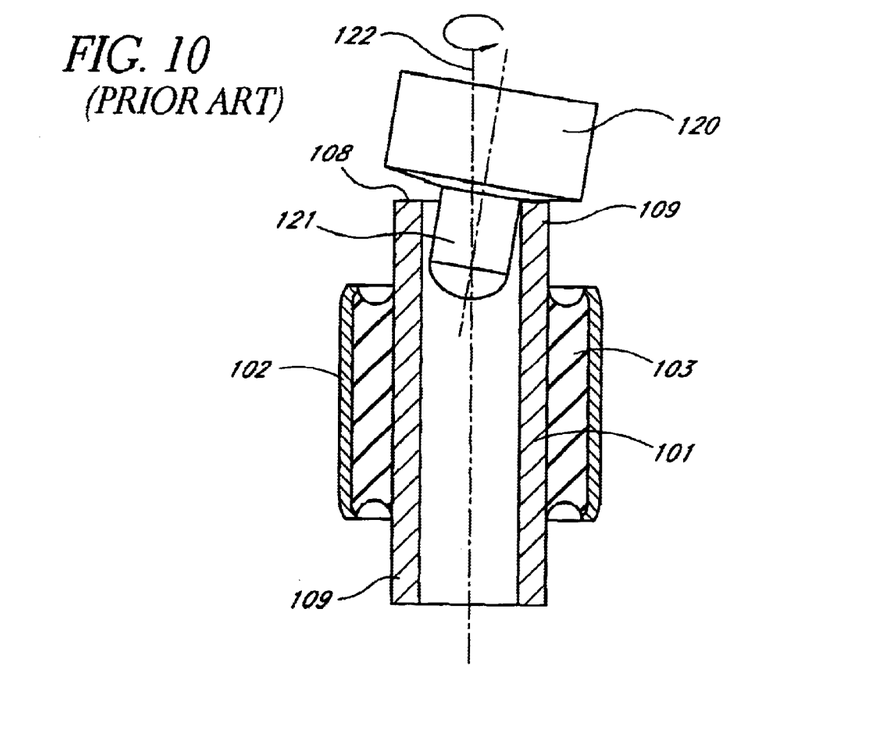
FIG. 10 is a sectional view showing a conventional process, when a conventional vibration-isolating bushing is subjected to upsetting working.
Figure 11:
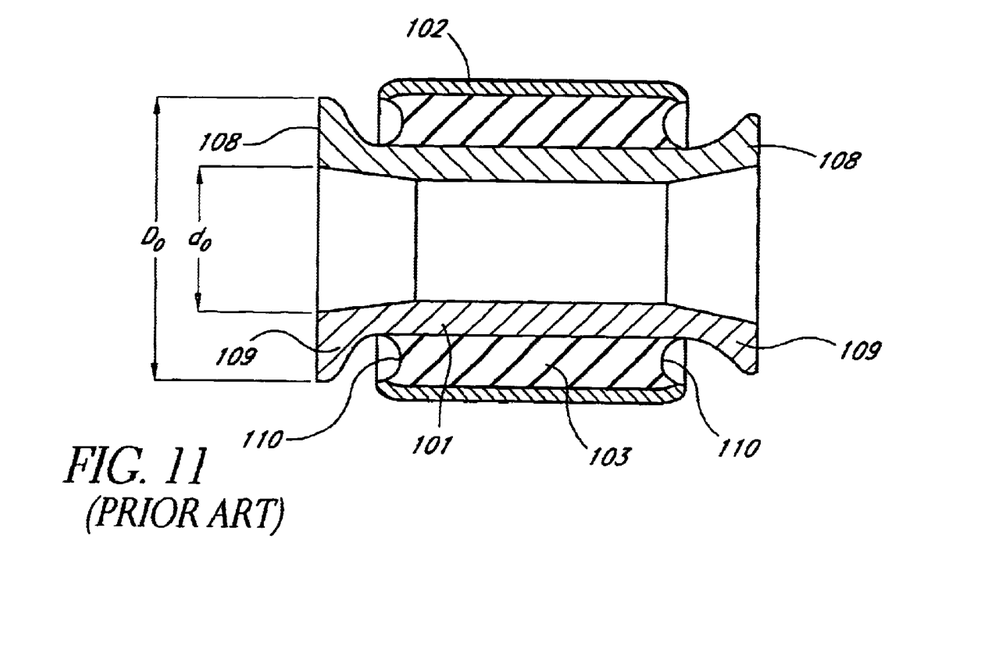
FIG. 11 is a longitudinal sectional view of the conventional vibration-isolating bushing obtained by the upsetting working shown in FIG. 10.

JP Patent Publication 1993-200438 A1 discloses, as shown in FIG. 10, upsetting the extremities 109 of the inner cylinder 101 by cold plastic working by the use of an upsetting jig 120 after vulcanization molding of the rubber elastomer 103 thereby enlarging the edge surfaces 108. In this reference, an upsetting jig 120 having at its top central surface a projection 121 is used and the edge surface 108 is enlarged by pressing the upsetting jig 120 onto the edge surface 108 of the inner cylinder while causing it to gyrate on a conical orbit centering the axis 122 of the inner cylinder 101 thereby enlarging the edge surface 108 as shown in FIG. 11. According to this method it is possible to enlarge the area of each edge surface 108 of the inner cylinder 101 without using any thick-walled tube and besides it is also possible to enlarge the edge surfaces 110 of the rubber elastomer 103 thereby to secure sufficiently a free length to the elastic deformation.

Nevertheless according to the upsetting method as disclosed in the reference, the extremity 109 of the inner cylinder 101 is enlarged in inside diameter $d_0$ as well as outside diameter $D_0$ as shown in FIG. 11, so that the area of the edge surface 108 of the inner cylinder is narrowed by the increment in inside diameter $d_0$ and hence it is difficult to secure an area enough to reduce the surface area against the axial force.

In view of the prior art problems and difficulties above, this invention has been made and accordingly, a principal object of this invention is to provide a method of producing a vibration-isolating bushing with which it is possible to secure a much larger areas for each edge surface of the inner cylinder in upsetting the extremities of the inner cylinder by cold plastic working after vulcanization molding of the rubber elastomer than conventional method.

SUMMARY OF THE INVENTION

This invention provides a method of producing a vibration-isolating bushing comprising securing a rubber elastomer to an outer circumference of an inner cylinder by vulcanization molding and is characterized in that in upsetting axial extremities of the inner cylinder by cold plastic working after vulcanization molding, an upsetting jig whose top surface is substantially flat is used to as an upsetting jig for pressing onto each edge surface of the inner cylinder and the top surface of the upsetting jig is pressed onto the edge surface of the inner cylinder while causing it to gyrate on a conical orbit centering the axis of the inner cylinder, thereby enlarging the edge surface of the inner cylinder.

By conducting the upsetting of extremities of the inner cylinder by the use of such an upsetting jig that has at its top surface no projection, but is flat by reason of the pressing and gyration motion it is possible to upset the outside diameter side only while suppressing the upsetting at the inside diameter side and consequently, to secure sufficiently the areas of edge surfaces of the inner cylinder.

In the production method of this invention, alternatively, such an upsetting jig that its top surface is slightly bulged to assume a conical surface may be used and the upsetting jig can be tilted relative to the axis of the inner cylinder so that the conical surface may be nearly in parallel with the edge surfaces of the inner cylinder. This method is effective in case where only the outside diameter is upset and the inside diameter is hardly changed.

Further in accordance with the production method of the invention, a constraint wall for surrounding the outer circumference of each of the extremities of the inner cylinder to be upset may be vertically arranged at the peripheral portion of the top surface of the upsetting jig, thereby inhibiting the extremities from being enlarged beyond a predetermined diameter. This method is effective in case where the outside diameter is upset while the inside diameter is reduced, whereby it is possible to secure all the more the areas of edge surfaces of the inner cylinder.

BRIEF DESCRIPTION OF THE DRAWINGS

The invention will be hereinafter described in more detail for several embodiments with reference to the accompanying drawings: in which.

DESCRIPTION OF PREFERRED EMBODIMENTS

Figure 1:
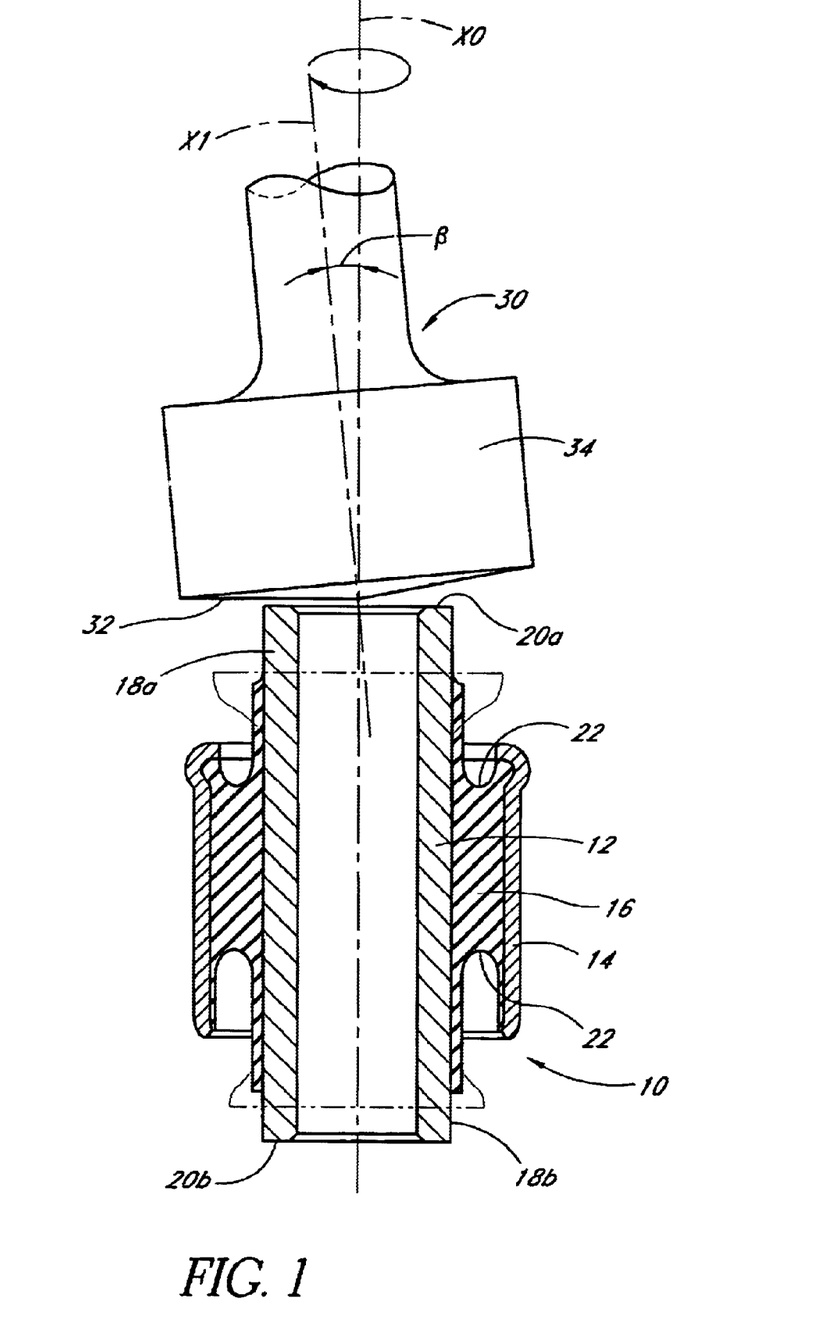
FIG. 1 is a sectional view showing a vibration-isolating bushing when subjected to upsetting working according to a first embodiment of this invention.
Figure 2:
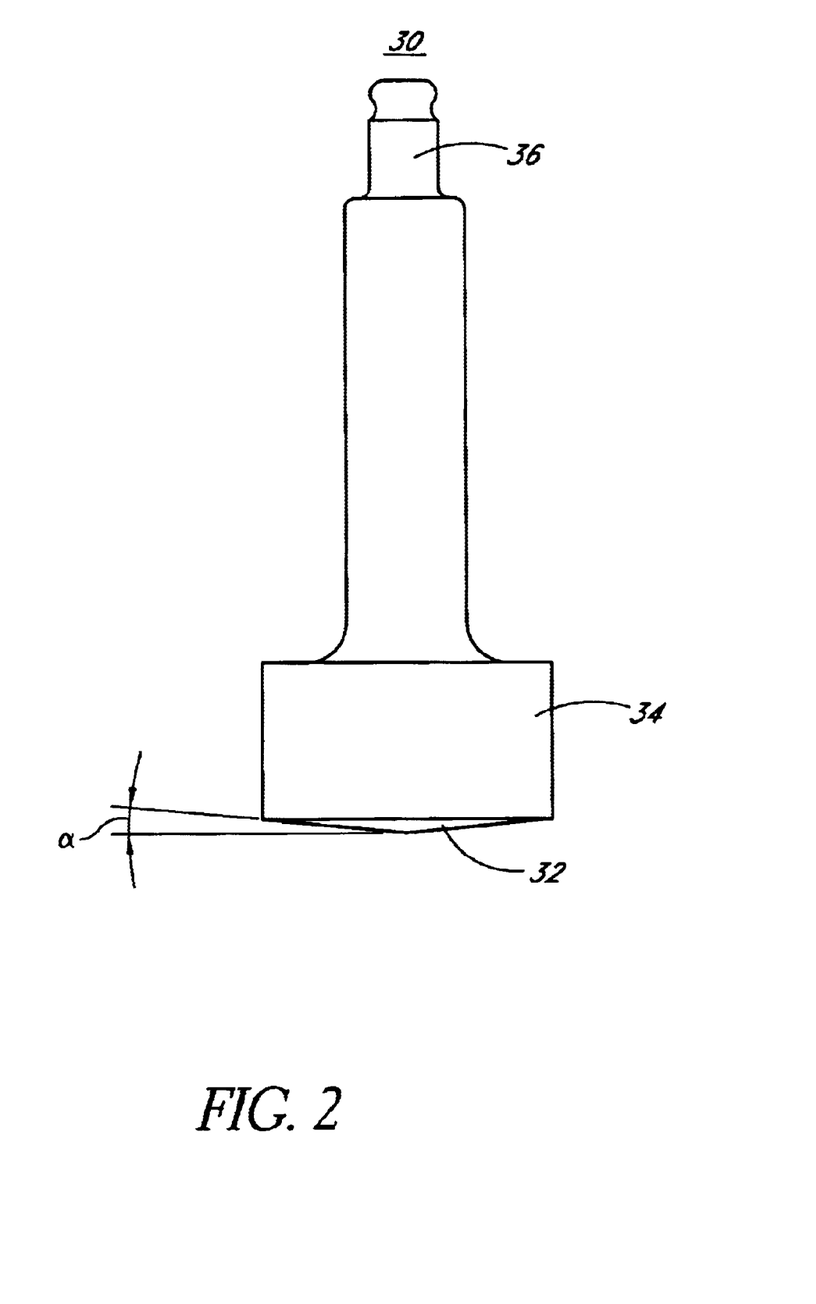
FIG. 2 is an elevational view of an upsetting jig used for the abovementioned upsetting working.
Figure 3:
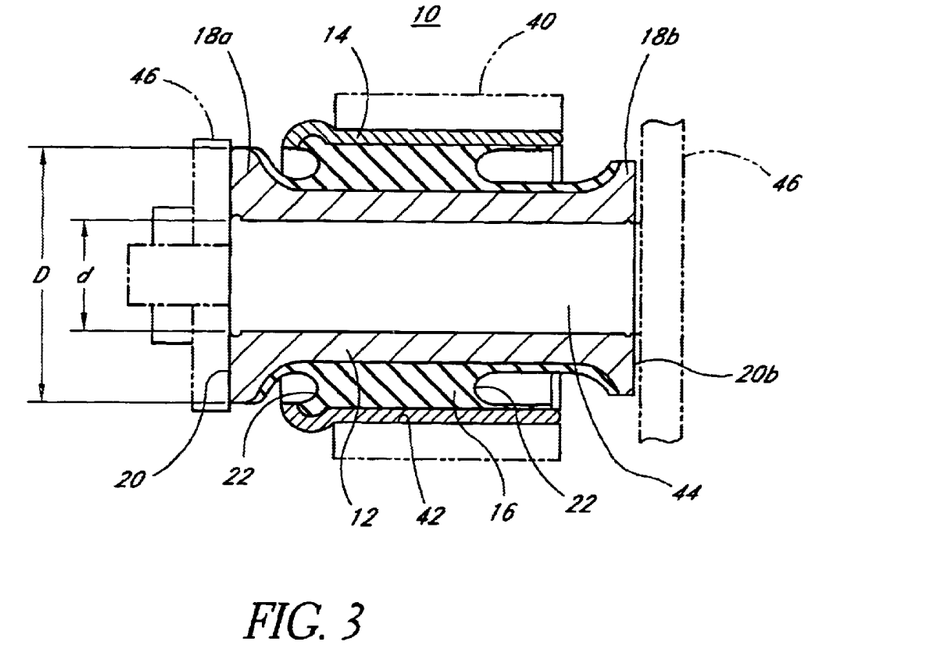
FIG. 3 is a longitudinal sectional view of a vibration-isolating bushing thus obtained by the upsetting working.

FIGS. 1 to 3 are concerned with a first embodiment of this invention; FIG. 1 is a sectional view of a vibration-isolating bushing 10 upon upsetting working, FIG. 2 is an elevational view of an upsetting jig 30 used for the upsetting working, and FIG. 3 is a sectional view of the vibration-isolating bushing 10 thus obtained.

That is, the vibration-isolating bushing 10 is made up of an inner cylinder 12 and an outer cylinder 14 concentrically arranged in a spaced relation and made of a metal tube such as iron, steel, aluminum or alloy thereof, and a rubber elastomer 16 interposed between the inner and outer cylinders 12, 14 by vulcanization molding to bond integrally both cylinders. The rubber elastomer 16 is secured to an outer circumferential surface of the inner cylinder 12 and an inner circumferential surface of the outer cylinder 14 by vulcanization adhesion means. As shown in FIG. 3 the inner cylinder 12 is somewhat longer than the outer cylinder 14 and the rubber elastomer 16, and upset at both extremities 18a, 18b to form enlarged edge surfaces 20a, 20b as compared to the edge surface with a normal wall thickness.

In producing the vibration-isolating bushing 10, first, the rubber elastomer 16 is molded by vulcanization between the inner cylinder 12 and the outer cylinder 14 in a mold cavity (not shown). At that time, as the inner cylinder 12, as shown in FIG. 1, a straight tube, which is not subjected to upsetting working at both extremities 18a, 18b is used by cutting in a length a little longer than the final product, taking account of the upsetting working of the extremities.

Then, the vulcanization molded body is subjected to a cold plastic working that imparts a plastic deformation to the the axial extremities of the inner cylinder 12, thereby upsetting the extremities. More specifically, as a working jig for butt pressing onto the edge surfaces 20a, 20b of the inner cylinder 12, an upsetting jig having a nearly flat top edge surface 32 as shown in FIG. 1 is used. While causing the upsetting jig to gyrate on a conical orbit centering the axis x0 of the inner cylinder 12, the top edge surface 32 of the upsetting jig 30 is pressed onto the edge surfaces 20a, 20b of the inner cylinder 12 thereby enlarging the edge surfaces of the inner cylinder 12.

As shown in FIG. 2, the upsetting jig 30 is provided with a large-diameter columnar portion 34 at its lower end and an attachment portion 36 at its upper end so that the attachment portion 36 may be fitted to a revolution device not shown. The top edge surface 32 of the upsetting jig 30, which is the underside of the columnar portion 34, is formed in a nearly flat conical plane slightly projecting forwardly to the pressing direction. The tilting angle α of the conical surface (edge surface) 32 is usually set to be 0~10°. The diameter of the columnar portion 34 is set larger than the outside diameter of the inner cylinder 12 as illustrated in FIG. 1.

The upsetting jig 30 is fitted to the revolution device to be tilted so that the axis center x1 makes a definite angle of β relative to the axis x0 of the inner cylinder 12. And the upsetting jig 30 presses the edge surfaces 20a, 20b of the inner cylinder 12 while conducting a gyration movement so that the axis x1 may move on a conical surface centering the axis x0 by the operation of the revolution device. The angle β is set so that the conical top edge surface 32 of the upsetting jig 30 may be nearly in parallel with the edge surfaces 20a, 20b of the inner cylinder 12, and accordingly, set to be nearly the same as the tilting angle α of the top edge surface 32.

The upsetting working of the inner cylinder 12 by means of the upsetting jig 30 is started first from the one extremity, for example, the extremity 18a to be subjected to a larger plastic deformation according to the procedure described above, and thereafter conducted similarly with the other extremity 18b to be subjected to a smaller plastic deformation after inverting the vulcanization molded body upside down.

It is thereby possible to work the inner cylinder in a shape as shown in FIG. 3. That is, according to the upsetting method of this embodiment, because of the use of the upsetting jig having a flat top edge surface 32, not having any central projection, it is possible to suppress the upsetting on the inside diameter side of the extremity 18 of the inner cylinder and accordingly, to upset the outside diameter D only whilst the inside diameter d little changes and remains the same as that of the original tube.

The vibration-isolating bushing 10 thus obtained is, as shown in FIG. 3, fixed with the outer cylinder 14 press fitted into an attachment hole 42 of a support member 40 such as suspension arms or the like and with the inner cylinder 12 pierced into a shaft member 44 on the other support side and fastened with support members 46 such as brackets in the state pinched from both sides.

According to the first embodiment thus described, because the extremities 18a, 18b of the inner cylinder 12 are subjected to upsetting working to enlarge the edge surfaces 20a, 20b it is possible to secure such an area that can reduce the surface pressure against the axial force by fastening with the support members 44 without the necessity of increasing the wall thickness of the inner cylinder 12 and besides, at a light weight and a cheep cost. In particular, because the upsetting jig 30 having no projection, but a flat surface at the top edge surface 32 is used, it is possible to upset the outside diameter D only so as not to change the inside diameter d and hence it is possible to secure a sufficiently large area of the edge surface 20 of the inner cylinder 12.

Furthermore, since after vulcanization molding of the rubber elastomer 16 the inner cylinder 12 is subjected to upsetting working at extremities 18a, 18b, it is possible to set voluntarily extremities 22 of the rubber elastomer 16 in any shape such as curved shape or the like. For example, as shown in FIG. 3, it is also possible to form both extremities 22 of the rubber elastomer 16 as hollowed-out portions axially recessed. Thus a large area of each of the extremities 22 of the rubber elastomer 16 can be secured and consequently, a sufficient free length to elastic deformation can be secured thereby enhancing the durability of the rubber elastomer 16.

Figure 4:
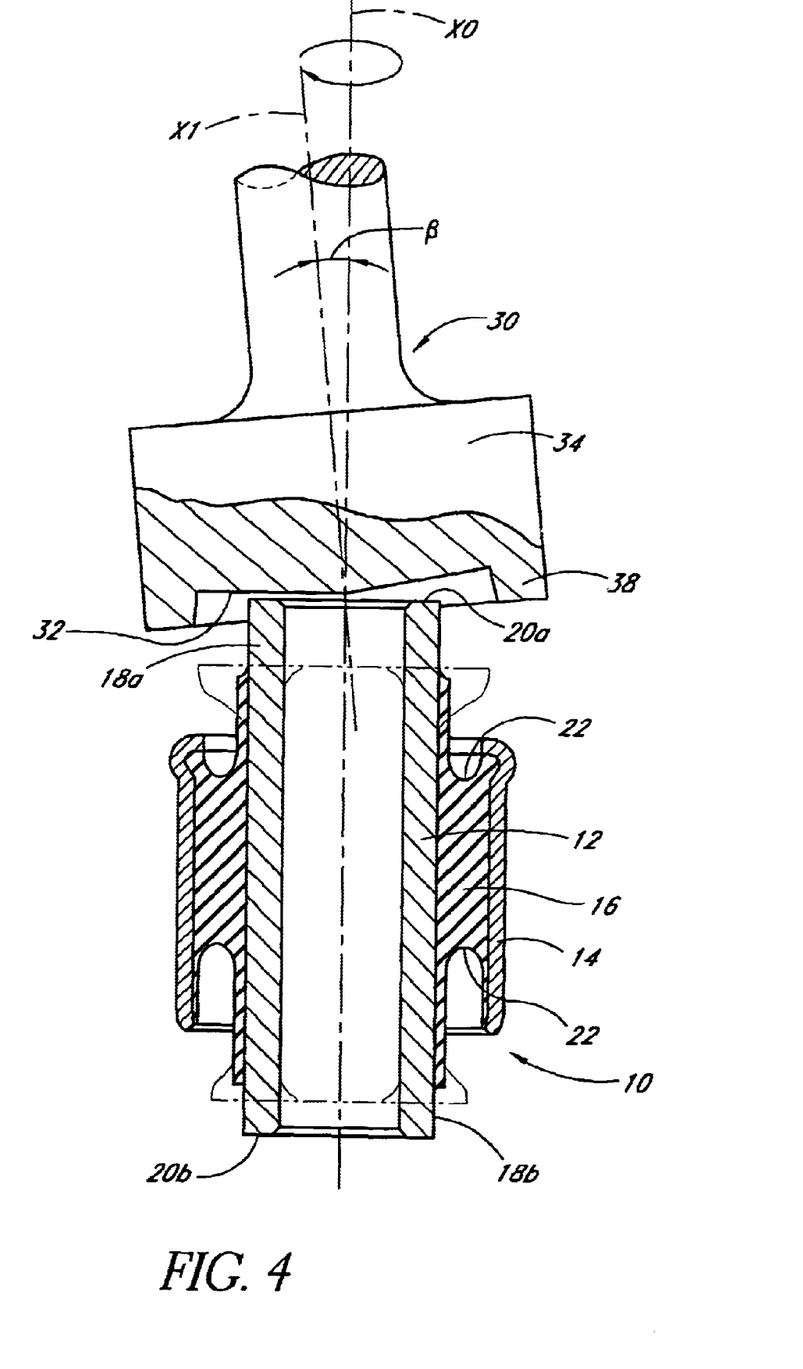
FIG. 4 is a sectional view showing a vibration-isolating bushing upon upsetting working according to a second embodiment of the invention.
Figure 5:
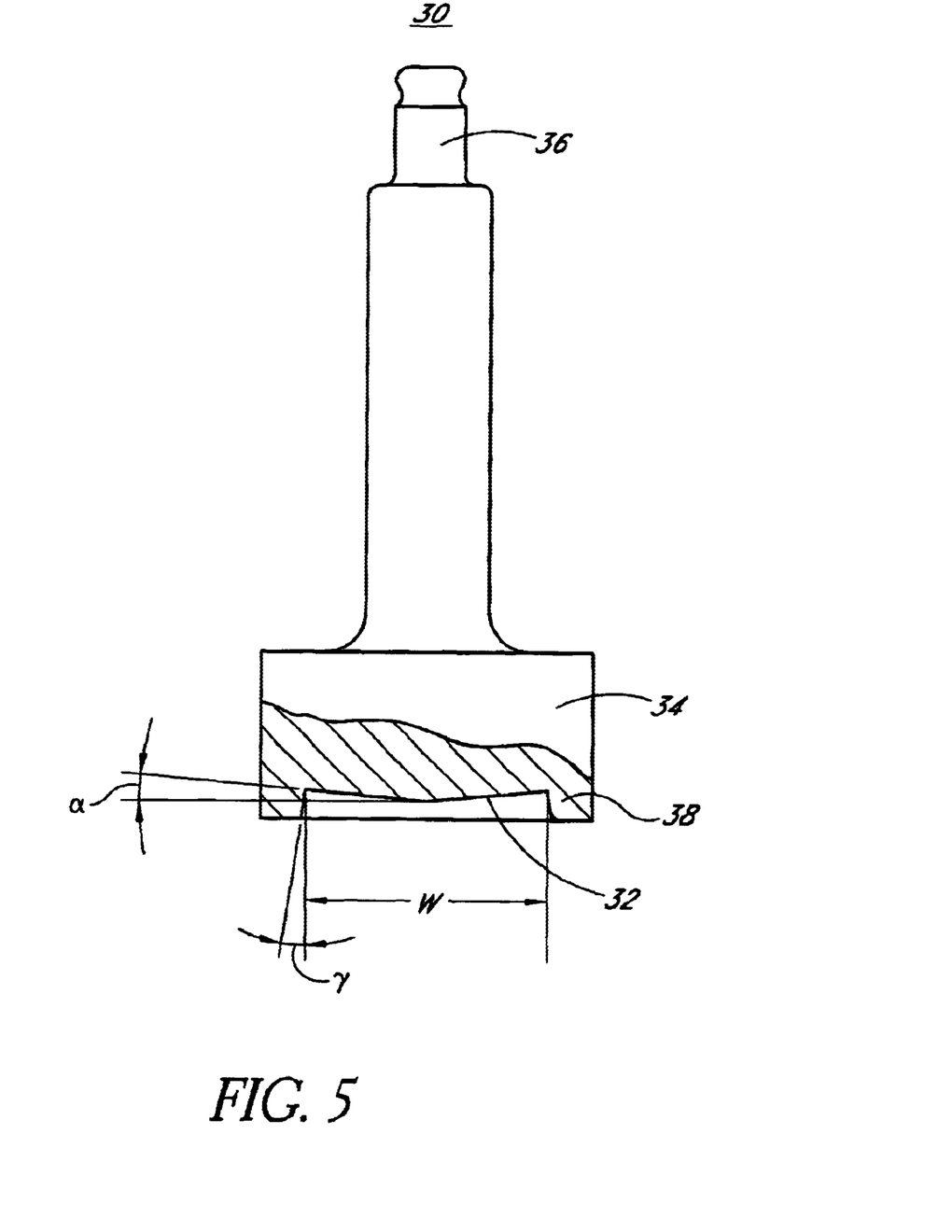
FIG. 5 is an elevational view of an upsetting jit used for the abovementioned upsetting working.
Figure 6:
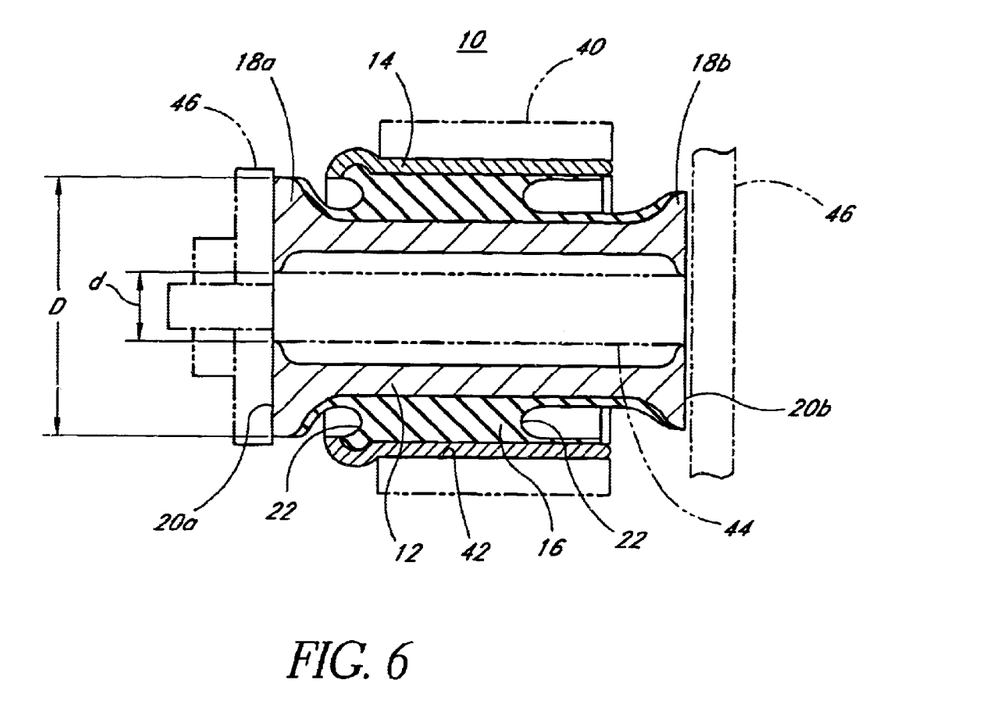
FIG. 6 is a longitudinal sectional view of a vibration-isolating bushing obtained by the upsetting working of the second embodiment.
Figure 7:
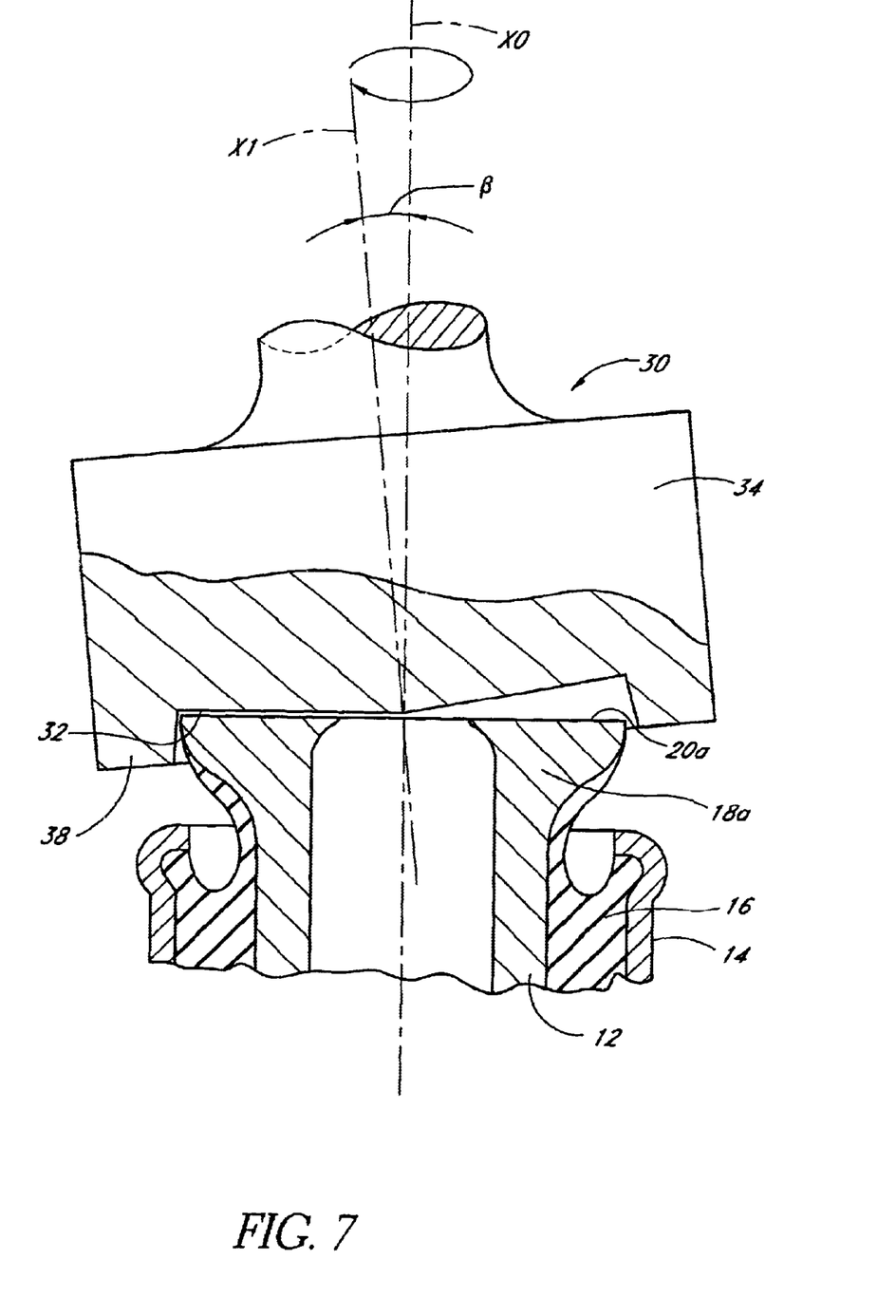
FIG. 7 is an enlarged sectional view illustrating essential parts of the second embodiment when the upsetting working is finished.

FIG. 4 is a sectional view of a vibration-isolating bushing 10 relating to a second embodiment of this invention when subjected to upsetting working; FIG. 5 is an elevational view of an upsetting jig 30 used for the upsetting working; FIG. 6 is a sectional view of the vibration-isolating bushing 10 obtained by the upsetting working; FIG. 7 is an enlarged sectional view showing essential parts when the upsetting working is finished.

This second embodiment is different from the first embodiment in the shape of the upsetting jig 30 for working extremities of the inner cylinder 12. That is, in this embodiment, a constraint wall 38 for surrounding the whole outer peripheries of the extremities 18a, 18b of the inner cylinder 11 to be upset is disposed vertically in the peripheral portion of the top edge surface 32 assuming a nearly flat conical surface of the upsetting jig 30 so as to restrain the extremities 18a, 18b of the inner cylinder from being upset more than a required diameter.

As shown in FIG. 5, the constraint wall 38 is formed to project downwardly from the periphery of the top edge surface 32 of the columnar portion 34, namely forwardly in the pressing direction and its inside is formed to be in a nearly flat conical plane. The wall surface at the inner periphery side of the constraint wall 38 is tilted outwardly by a required angle γ, and the angle γ is set to be nearly the same as the tilting angle of the top edge surface 32 so that the wall surface is substantially vertical to the extremity 20 of the inner cylinder upon upsetting working. The width W of the conical, practically flat surface inside the constraint wall 38 is set appropriately depending on a desired dimension of the outside diameter D of the extremity 18 of the inner cylinder to be upset.

When the upsetting working is likewise conducted using this upsetting jig 30 as shown in FIG. 4, the outer periphery of the extremity 18a of the inner cylinder 12 is, as shown in FIG. 7, enlarged in diameter up to the constraint wall 38, from where the extremity is no longer able to further enlarge on the outside diameter side, so that a plastic deformation occurs by that amount toward the inside diameter side. Thereby it is possible simultaneously to enlarge the outside diameter D and to decrease the inside diameter d of the extremity 18 of the inner cylinder 12 as shown in FIG. 6, thereby securing a further large area for the edge surface 20 of the inner cylinder 12.

In the embodiments described above, the upsetting working is applied to both extremities 18a, 18b of the inner cylinder 12, but this invention is not limited to these examples, but only one extremity may be upset. The description above was made on the vibration-isolating bushing 10 of the type that the rubber elastomer 16 is interposed between the inner cylinder 12 and the outer cylinder 14 to be press fitted in the attachment hole 42 of the support member 40 and secured to both cylinders, but it is possible to likewise construct the extremity 18 of the inner cylinder 12 also in another type of vibration-isolating bushing that is used by press fitting the rubber elastomer 16, secured only to the outer circumference of the inner cylinder 12 by vulcanization molding, into the attachment hole of the other support member.

According to the method of producing a vibration-isolating bushing of this invention as described above, it is possible to make the area of each extremity of the inner cylinder large without making the wall thickness of the inner cylinder large by upsetting the extremities of the inner cylinder by plastic working after vulcanization molding of the rubber elastomer. In particular, it is possible to upset the edge surface of the inner cylinder at its outside diameter only, while suppressing the upsetting at its inside diameter by conducting the upsetting by means of an upsetting jig having no projection, but a flat top surface. Therefore, it is possible to secure the area of each edge surface of the inner cylinder sufficiently. Moreover it is possible to secure a sufficient free length of the rubber elastomer and the production at a light weight and a low cost is feasible.

What is claimed is:

1. A method of producing a vibration-insulating bushing, comprising:

providing a cylinder having an outer circumference on which a rubber elastomer is secured by vulcanization molding; and submitting an axial extremity of the cylinder to upsetting by cold plastic working comprising:

(i) pressing a top surface of an upsetting jig onto an edge surface of the axial extremity of the cylinder, said top surface of the jig having a flattened conical surface with no elongated projection its center and having a constraint wall formed around the flattened conical surface for restricting the outward widening of the edge surface of the cylinder while moving the jig;

(ii) moving the jig along the edge surface of the axial extremity of the cylinder, wherein the axis of the jig moves in a conical orbit around and on a point where the axis of the jig and the axis of the cylinder intersect, thereby widening the edge surface of the inner cylinder in an outward direction; and (iii) continuing the moving of the jig until the edge surface of the cylinder contacts the constraint wall and begins extending inward, thereby narrowing an inner diameter of the edge surface of the cylinder.

2. The method according to claim 1, wherein when the jig moves in an orbit, the top surface of the jig contacting the edge surface of the axial extremity of the cylinder is angled perpendicularly to the axis of the cylinder.

* * * * *